United States Patent [19]

Sternick et al.

[11] 4,275,461
[45] Jun. 23, 1981

[54] PARALLEL DIGITAL BEAM-FORMING SYSTEM

[75] Inventors: Leon Sternick, Plainview; John D. Lea, Huntington Station, both of N.Y.

[73] Assignee: The United States of America as represented by the Sectetary of the Navy, Washington, D.C.

[21] Appl. No.: 599,995

[22] Filed: Dec. 5, 1966

[51] Int. Cl.³ .............................................. G01S 3/80
[52] U.S. Cl. .................................... 367/122; 367/123
[58] Field of Search .................. 340/6, 16; 343/100.6, 343/113, 113 R; 367/118, 122, 123, 126

[56] References Cited
U.S. PATENT DOCUMENTS 3,039,094  6/1962  Anderson ........................ 343/113 R
3,163,844  12/1964  Martin ............................. 367/123 X Primary Examiner—Richard A. Farley
Attorney, Agent, or Firm—Richard S. Sciascia; Arthur A. McGill

[57] ABSTRACT

A parallel digital beam-former for an array of hydrophones. The output of each hydrophone is fed into a different shift register. Each register stores the sampled time history of the hydrophone. The contents of each register are fed serially into a different gating circuit in the time interval between each new input signal sample and the output of each gating circuit is fed in parallel with the output of each of the other gating circuits to a group of beam gates. The output of each beam gate is then fed to a different binary counter which sums the signals. Each binary counter is associated with a different beam.

2 Claims, 3 Drawing Figures

PARALLEL DIGITAL BEAM-FORMING SYSTEM

This invention relates to apparatus for forming beams from an array of signal transducers and especially to a parallel digital beam-forming system.

In a beam-forming system, signals from an array of signal transducers, such as hydrophones, must be suitably delayed and then summed to form beams. For a preformed beam system, this must be done simultaneously for all beams. It is often advantageous to clip, or "hard limit", the signals from the hydrophones. This serves two important purposes:

First, it normalizes the noise voltages from each hydrophone and, therefore, normalizes the summed noise voltage as well; second, it allows the use of digital circuits as delay elements, since clipping is essentially a one-bit digital encoding process.

The use of clipped signals for simultaneous beam-forming has been known by the acronym DIMUS (digital multibeam steering). There have been several versions of the DIMUS concept. For example, the amplified and clipped signals can be sampled and delayed in delay lines or shift registers. Suitably tapped outputs are then summed together in a resistor summing circuit. One summing network is required for each beam. The resistor summing method has shortcomings with respect to the accuracy of the summed output. Matching of resistors, as well as the pulse voltages, must be accomplished within impractical limits.

Another DIMUS concept has been referred to as serial DIMUS. In this approach, the signals are amplified, clipped and sampled as before. However, the sampling is progressive and the sampled signals are fed into a single delay line through an OR gate. Suitable taps are arranged on the delay line (which could be a shift register), such that the summations of the outputs will form beams. If the array is symmetrical, the taps will be identical for all beams.

In general, beam-forming processes fall into two categories, serial or parallel beam-forming. A comparison of techniques shows that digital parallel beam-forming requires extremely simple circuitry compared to the serial method and to the analog parallel method. Also digital parallel beam-forming generally requires operation at lower frequencies and is endowed with intrinsically higher reliability. Implicit in serial beam-forming is the use of delay lines as data storage devices. If ability to vary delay time with the velocity of sound is added, there is considerable equipment complication to the serial method. A variation of the parallel method is to form beams in an analog fashion. This has been found to require many more interconnections than digital methods, and to add considerable complexity when circuit requirements for detection, long-term integration, and data storage are included.

The parallel digital approach is by far the most adaptable to modern microcircuit techniques and is potentially capable of achieving minimum cost.

In the instant parallel digital beam-former, all hydrophones are simultaneously sampled and the time history of each hydrophone is stored in a separate shift register. (The total number of shift registers is identical to that required in the serial method.) In between data samples, which are taken from all hydrophones simultaneously, the contents of the different shift registers all successively strobed through a set of beam gates into a set of binary digital counters. The signal output of each beam gate is a pulse train, each pulse coming from a different hydrophone. The digital counter sums these into a beam signal. The number of beam gates is equal to the number of binary counters and as many counters are required as the number of desired beams.

An object of this invention is to provide a parallel digital beam-forming apparatus.

Another object is to provide a beam-former in which the circuitry is simpler, less cumbersome, more economical and more reliable than that required by serial beam-formers.

A further object is to provide a beam-former in which the beams are formed by a simple counting technique.

Other objects and advantages will appear from the following description of an example of the invention, and the novel features will be particularly pointed out in the appended claims.

In the accompanying drawings:

FIG. 3 is a set of waveforms showing the relative time relations between the data shift signal and the timing signal.

Figure 1:
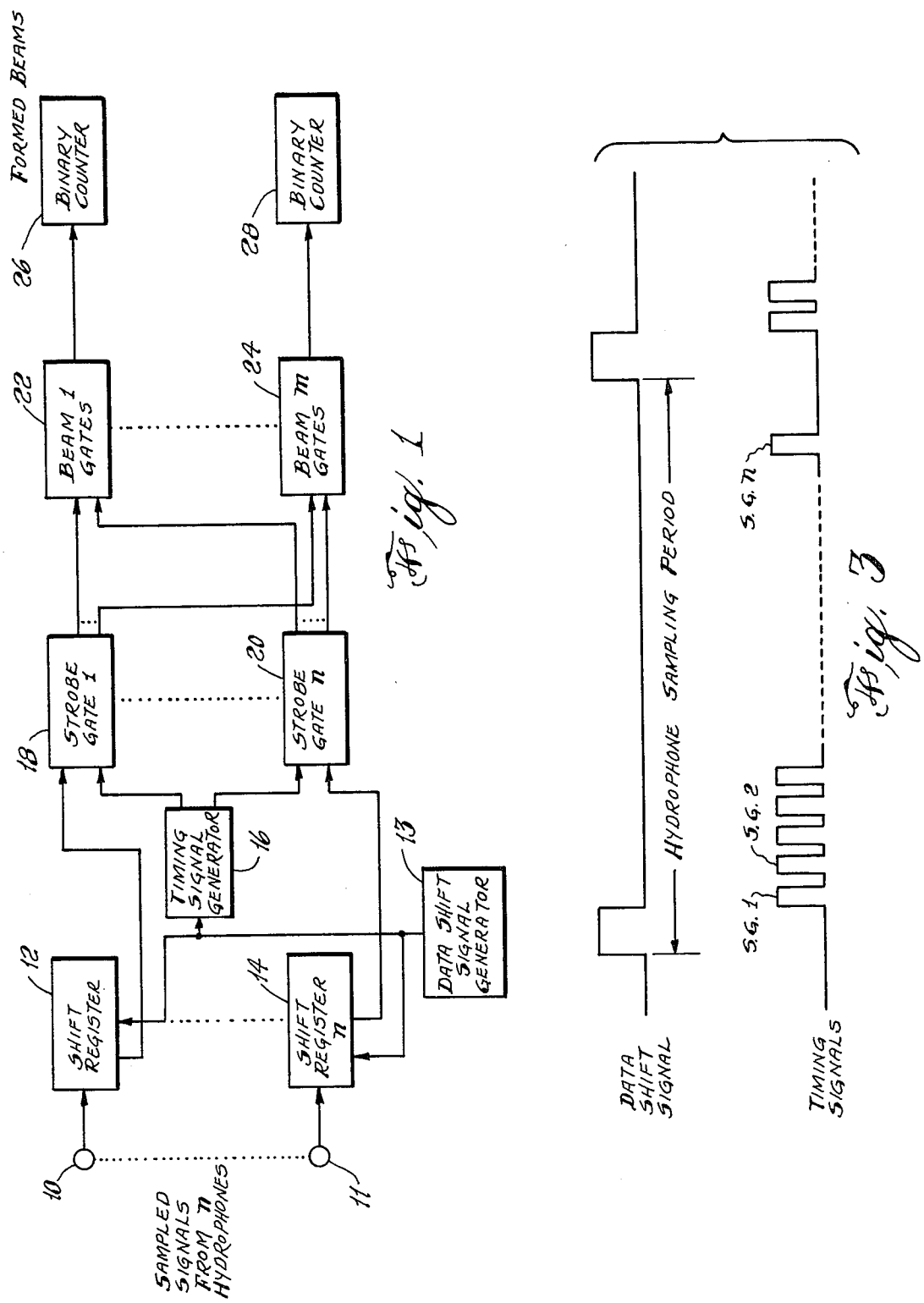
FIG. 1 is a block diagram of an embodiment of the invention.

FIG. 1 shows a block diagram of an embodiment of a parallel digital beam-former. Signals are fed to the beam-former from an array (which may or may not be symmetrical) of signal transducers, such as hydrophones, of which only the first and last hydrophones, 10 and 11, are indicated. (In general, only two levels of components of the beam-former are shown because the diagram would become unwieldy otherwise.) Each hydrophone, e.g. 10, is connected to the input of one shift register 12 which has its associated strobe gate 18; the strobe gate consists of a set of conventional AND gates. The outputs of the strobe gates are connected through the beam gates to the binary counters (e.g., beam 1 gate 22 is connected to binary counter 26) which sum the components of each beam. Each beam gate comprises a set of conventional OR gate circuits.

In operation, all shift registers from 1 to n are shifted simultaneously by the application of a shift signal, which may be termed the data shift signal, from the data shift signal generator 13. The data shift signal allows the hydrophone signal to enter the first flip-flop circuit, e.g., 38 of shift register 1 (12), and shifts all signals stored in the flip-flop circuits to the next adjacent flip-flop on the right. Thus, one of the functions which is performed by the data shift signal is the simultaneous sampling of all hydrophone signals. It is also evident that, within the limits of the capability of the shift registers, the time history of the signal output of each hydrophone is stored in its associated shift register.

Figure 2:
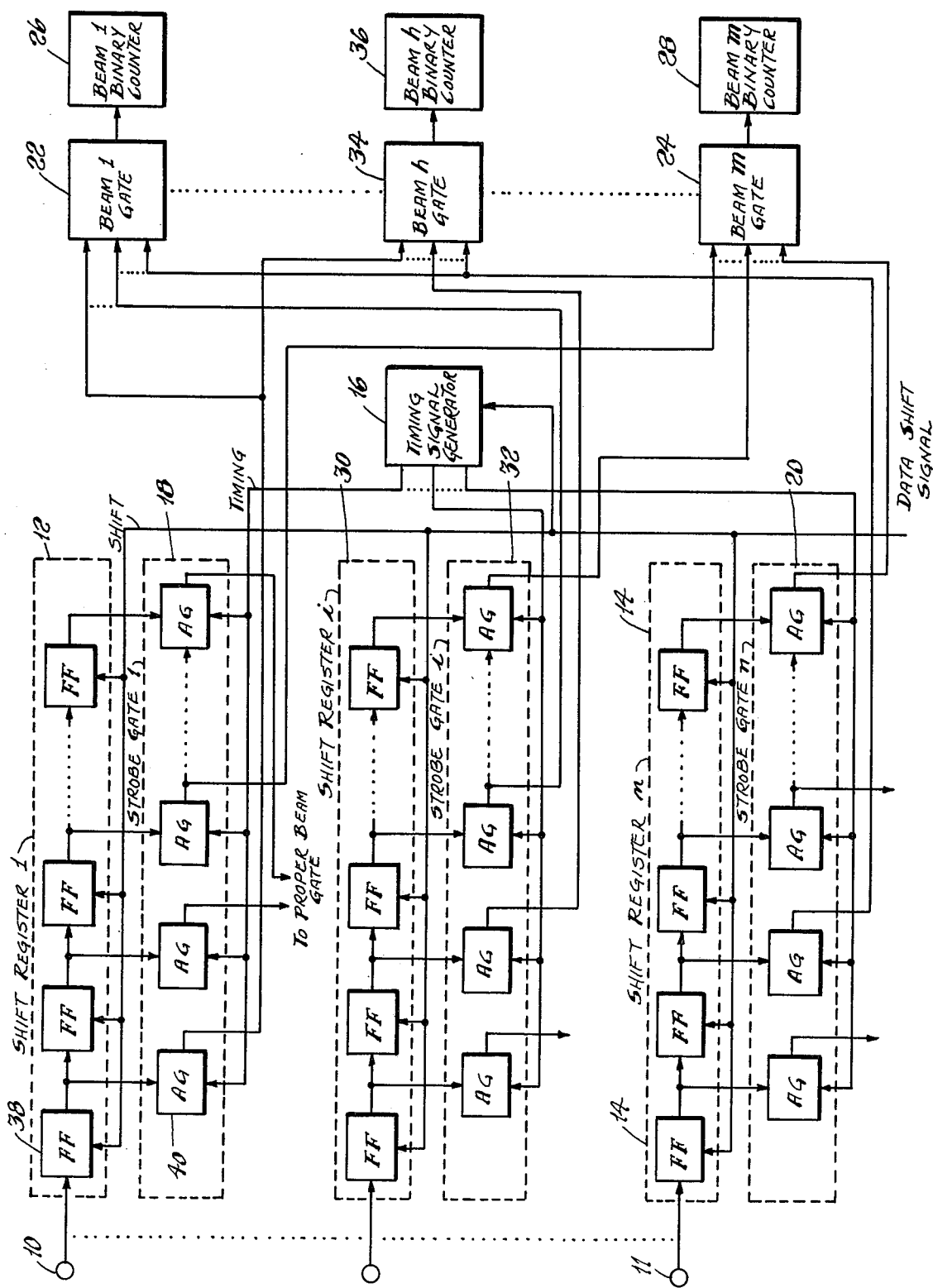
FIG. 2 is a block diagram showing further details of the shift registers, strobe gates and wiring of the embodiment shown in FIG. 1.

In the period between the occurrence of one data shift signal and the next (the hydrophone, or data, sampling period), the timing signal generator 16 provides the strobe gates with a series of signals, which may conveniently be pulses. It can be seen from FIG. 2 that each strobe gate, e.g., strobe gate 1(18) consists of a group of AND gates, e.g., 40, equal in number to the number of flip-flops in its associated register, e.g., 12. Each AND gate is connected to receive as an input the output of a different one of the flip-flops; e.g., AND gate 40 is connected to the output of flip-flop 38. All of the AND gates in a given strobe gate are also connected to receive the same timing signal from the timing signal generator 16. The timing signal permits all signals in the flip-flops of a given shift register to pass through the AND gates associated with the flip-flops at the time at which the timing signal is applied.

As previously mentioned, each beam gate consists of a group of OR gates. Each OR gate in a given beam gate is connected to the output of a different AND gate so that the given beam gate receives only one signal from any given hydrophone. The signals from the various hydrophones must, of course, have different delay values to form the desired beam; therefore the OR gates in a given beam gate must be connected to the proper AND gates in the various strobe gates. Since each strobe gate is pulsed (or "strobed") at a different time, the hydrophone samples which are fed to any given beam gate come in at different times and the output of any given beam gate is a train of pulses.

The train of pulses from a given beam gate is fed to an associated binary counter, e.g., the output of beam 1 gate 22 is fed to beam 1 binary counter 26, where it is summed to provide a characteristic beam signal. All of the beam signals are available simultaneously each hydrophone sampling period after the last strobe gate of the set has been sampled and before the next strobe gate cycle begins. Actually, each strobe gate can be termed a serializing means since it takes a group of paralleled inputs and transforms them into a single output in which the various input signals are converted into a serialized train of signals.

FIG. 3 shows the relative timing of the data shift signal pulses and the timing pulses which are sent to the strobe gates. During each hydrophone, or data, sampling period a group of n consecutive timing pulses are sent out, a different one to each strobe gate. The symbol S.G.1 in the figure denotes the timing signal pulse sent to strobe gate 1, and so on.

It will be understood that various changes in the details, materials, and arrangements of parts (and steps), which have been herein described and illustrated in order to explain the nature of the invention, may be made by those skilled in the art within the principle and scope of the invention as expressed in the appended claims.

We claim:

1. A parallel digital beam-former for use with an array of signal transducers comprising, in combination:
    a plurality of time-delay means, the number of said delay means being equal to the number of said transducers, each delay means being connected to receive as an input the output of a different one of said transducers and delaying said output in a series of increasing amounts;
    means connected to said delay means for causing said delay means to periodically and simultaneously sample the outputs of said transducers;
    means connected to said delay means for obtaining from each of said delay means a plurality of outputs comprising the series of increasingly delayed transducer signals, all outputs from a given delay means being simultaneously obtained, the series of outputs from any delay means being obtained at a different time than that from any other delay means, all delay means being tapped for their outputs before the next sampling of the outputs of the transducers;
    a plurality of serializing means connected to said time-delay means, each serializing means, having a plurality of inputs and providing a single output, the inputs to each serializing means being a set of delayed transducer signals, one input being derived from each transducer, the set of delayed transducer signals fed to each serializing means being chosen to conform to a different beam direction; and
    a plurality of means for transforming the output signals of said serializing means into signals indicative of beam signal strength, each transforming means being connected to a different one of said serializing means.

2. A parallel digital beam-former for use with an array of signal transducers comprising, in combination:
    a plurality of shift registers, each comprising a plurality of serially connected flip-flop stages and each register being connected to receive as an input the output of a different one of said transducers;
    means for simultaneously and periodically triggering all said shift registers, the output of its associated transducer being sampled by each shift register and the output of each flip-flop in any given shift register being forwarded as an input to the next flip-flop in the series at each triggering;
    a set of strobe gates, each being associated with a different one of said shift registers, each strobe gate consisting of a group of AND gates, each AND gate receiving as an input the output of a different flip-flop in the shift register associated with its strobe gate;
    means for actuating said strobe gates in consecutive order, all AND gates in a given strobe gate being actuated simultaneously to pass the output signals of the flip-flops to which the AND gates are connected;
    a set of beam gates equal in number to the predetermined number of beams which are to be formed, each beam gate consisting of a group of OR gates, each OR gate in a given beam gate being connected to a different AND gate and to no more than one AND gate in any given shift register, the set of AND gates which are connected to the OR gates of any given beam gate being selected to provide the delays required for the desired beam direction for that beam gate; and
    a set of binary counters, each connected to a different one of said beam gates, the output of each binary counter being indicative of the signal strength in its selected beam direction.

* * * * *